(12) United States Patent
Kiel et al.

(10) Patent No.: US 12,227,368 B2
(45) Date of Patent: Feb. 18, 2025

(54) RELEASABLE ATTACHMENT OF SCRAPER MODULES

(71) Applicant: Cornelia Kill-Frech, Havixbeck (DE)

(72) Inventors: Martin Kiel, Recklinghausen (DE); Claus Weimann, Wetter (DE)

(73) Assignee: Cornelia Kill-Frech, Havixbeck (DE)

( * ) Notice: Subject to any disclaimer, the term of this patent is extended or adjusted under 35 U.S.C. 154(b) by 60 days.

(21) Appl. No.: 17/921,592

(22) PCT Filed: Apr. 14, 2021

(86) PCT No.: PCT/EP2021/059698
§ 371 (c)(1),
(2) Date: Oct. 26, 2022

(87) PCT Pub. No.: WO2021/228484
PCT Pub. Date: Nov. 18, 2021

(65) Prior Publication Data
US 2023/0174318 A1    Jun. 8, 2023

(30) Foreign Application Priority Data

May 12, 2020    (DE) .................... 10 2020 112 875.4

(51) Int. Cl.
*B65G 45/12*    (2006.01)
(52) U.S. Cl.
CPC .................... *B65G 45/12* (2013.01)
(58) Field of Classification Search
None
See application file for complete search history.

(56) References Cited

U.S. PATENT DOCUMENTS

| 3,342,312 | A | 9/1967 | Reiter |
| 6,948,609 | B2 * | 9/2005 | Finger .................... B65G 45/16 198/497 |

(Continued)

FOREIGN PATENT DOCUMENTS

| AU | 537018 B2 | 5/1984 |
| AU | 2010200386 B1 | 9/2010 |

(Continued)

OTHER PUBLICATIONS

International Search Report and Written Opinion of International Searching Authority for International Patent Application No. PCT/EP2021/059698, with English translation of Search Report, mailed Jul. 12, 2021 (14 pages).

(Continued)

*Primary Examiner* — Kavel Singh
(74) *Attorney, Agent, or Firm* — Ice Miller LLP; Justin D. Swindells (57) ABSTRACT

A scraper system for a conveyor system having a conveyor belt and a method for attaching a scraper module to a scraper system. The scraper system includes a system carrier and scraper modules for contacting the conveyor belt. The scraper modules are attached to a module carrier that extends on the system carrier parallel to the system carrier. The module carrier is releasably attached to the system carrier by a clamping assembly for applying a clamping force in the transverse direction to the system carrier. The clamping assembly has a clamping rod that runs parallel to the system carrier and applies the clamping force by wedge action.

10 Claims, 6 Drawing Sheets

(56) References Cited

U.S. PATENT DOCUMENTS

| | | | | |
|---|---|---|---|---|
| 6,991,088 | B1* | 1/2006 | Smith | B65G 45/16 198/499 |
| 8,042,679 | B2* | 10/2011 | Uchida | B65G 45/16 198/499 |
| 8,393,459 | B2* | 3/2013 | Childs | B65G 45/12 198/497 |
| 11,225,383 | B2* | 1/2022 | Schwarze | B65G 45/16 |
| 2001/0054539 | A1 | 12/2001 | Swinderman | |
| 2006/0225990 | A1 | 10/2006 | Yoshizako et al. | |
| 2010/0219045 | A1 | 9/2010 | Uchida | |
| 2015/0027858 | A1 | 1/2015 | Brotzmann | |
| 2015/0360880 | A1 | 12/2015 | Krosschel | |
| 2016/0001329 | A1 | 1/2016 | Schwarze | |
| 2021/0130105 | A1 | 5/2021 | Schwarze | |

FOREIGN PATENT DOCUMENTS

| | | |
|---|---|---|
| CN | 104271472 A | 1/2015 |
| DE | 102013006821 A1 | 7/2014 |
| DE | 102017114931 A1 | 7/2018 |
| EP | 0270142 B1 | 3/1991 |
| EP | 0566486 A1 | 10/1993 |
| EP | 2534078 A1 | 12/2012 |
| EP | 2534078 B1 | 5/2021 |
| JP | 2016-199383 A | 12/2016 |
| RU | 2309883 C2 | 11/2007 |
| WO | WO 03074393 A1 | 9/2003 |
| WO | 2011/106744 A1 | 9/2011 |
| WO | WO 2019/025114 A1 | 2/2019 |

OTHER PUBLICATIONS

Taiwanese Patent Office; Notification for the Opinion of Examination for Taiwanese Application No. 110116912, dated Aug. 26, 2022 (6 pages).

International Preliminary Report on Patentability and English translation of Written Opinion of International Searching Authority for International Application No. PCT/EP2021/059698, mailed Nov. 24, 2022 (9 pages).

* cited by examiner

RELEASABLE ATTACHMENT OF SCRAPER MODULES

CROSS-REFERENCE TO RELATED APPLICATIONS

This application is a U.S. National Stage of International Application No. PCT/EP2021/059698, filed Apr. 14, 2021, which claims the benefit of Germany Patent Application No. 10 2020 112 875.4, filed May 12, 2020, both of which are incorporated herein by reference in their entireties.

FIELD OF THE INVENTION

The invention relates to a scraper system for a conveyor system having a conveyor belt, a module carrier for such a scraper system and to a method for attaching a scraper module to a scraper system.

BACKGROUND OF THE INVENTION

The use of scraper systems is known for conveyor belts which are used for conveying an extremely wide range of conveyed goods. As a result of a scraping element contacting the running conveyor belt, any conveyed goods adhering thereto are scraped off. Known scraper systems have a plurality of scraper modules with scraping elements as well as a system carrier which extends transversely to the running direction of the conveyor belt.

Various types and designs of scraper systems and scraper modules are known. For example, DE 10 2017 114 931 A1 shows a scraper system for arrangement in the deflection region of fast-running belt conveyors formed by a tripper pulley. Scraping blocks made of elastic material are fastened next to one another in an exchangeable manner to a system carrier which is arranged transversely to the running direction of the belt conveyor and spring-mounted.

DE 10 2013 006 821 A1 describes a belt scraper system made up of modules for the return region of conveyors. A system carrier is arranged transversely to the running direction of the conveyor belt. Multiple scraping modules are attached next to one another onto the system carrier. The scraping modules each carry a scraping lamella which lies in contact with the belt in a peeling manner.

Scraper systems regularly require maintenance. In particular, the scraping elements attached to the scraper modules, for example scraping lamellas or scraping blocks, have to be regularly exchanged and replaced.

EP 0 270 142 B1 describes a scraper for a conveyor belt having a number of scraping elements which each have scraping blades and are arranged next to one another on an elongate carrier which extends transversely to the longitudinal direction of the conveyor belt and is attached to the frame of the belt conveyor in such a manner that the scraping elements are pressed with their free edges against the lower face of the conveyor belt. The scraping elements are divided into two groups and arranged on two bar-like rod elements having a U-shaped cross-section. The rod elements are arranged on a carrier having a rectangular cross-section. At the end, they have openings, into which projecting pins of the carrier engage. At the opposite end in each case, the elements have flanges, to which they are fastened with bolts by screw connections.

US 2015/0360880 A1 relates to a scraping device for a conveyor belt having a removable scraper assembly which is connected in a simple manner to an elongate carrier and which can be removed from the latter. The assembly comprises scraper blades which are attached to an angle strut. A pair of clamps, with which the angle strut is attached in a clamping manner to receptacles on the carrier, serve as a securing mechanism.

U.S. Pat. No. 3,342,312 discloses a scraping device for a conveyor belt having a plurality of individual scraping blade assemblies. A tube is arranged transversely to the conveyor belt. A holder of L-shaped cross-section is rotatably and slidably attached onto the tube by means of C-clips.

SUMMARY OF THE INVENTION

It can be regarded as an object to propose a scraper system, a module carrier segment for this as well as a method for attaching a scraper module to a scraper system, in which scraper modules can be exchanged in a simple manner.

The object is achieved according to a first aspect by a scraper system with a releasable module carrier and a corresponding method for attaching a scraper module. According to a second aspect of the invention, the object is achieved by a scraper system with a plurality of aligned module carrier segments and a module carrier segment for this. Dependent claims refer to advantageous embodiments of the invention.

The inventors started from the consideration that it is particularly difficult to carry out maintenance work on the scraper system and, in particular, to exchange wearing parts if dangerous contact regions have to be entered and therefore safeguard measures such as, for example, the installation of scaffolding or similar as well as longer operational interruptions are required. The possibility of performing maintenance work on scraper modules from outside the belt region, ideally without having to carry out work inside the chute or below the belt conveyor, would therefore be of particular interest.

The inventors therefore propose an easily exchangeable attachment for scraper modules, which makes it possible to simplify the process of exchanging scraper modules, wherein the period spent in the region beneath the belt conveyor can be minimized or even avoided completely.

The scraper system according to the invention comprises a system carrier which preferably extends transversely to the running direction of the conveyor belt. The system carrier can, for example, be embodied as a rod or tube having, e.g., a circular or rectangular cross-section. It is preferably attached to both sides in a stationary manner, for example to the belt framework. The system carrier can be arranged so that it is fixed or alternatively movable, in particular in a spring-mounted manner.

The scraper system according to the invention further has a plurality of scraper modules. These are provided for contacting the conveyor belt and, to this end, preferably have a scraping element which can be, for example, an edge, a lamella, a scraping block or a different type of scraping element. The scraper modules can have different configurations, depending on the type and arrangement of the scraper system relative to the conveyor belt. For example, the scraper modules can have one or more elements which are movable with respect to one another and hinges, springs, etc. arranged therebetween. Likewise, the scraper modules can be block elements, for example, preferably made of a flexible material.

According to the first aspect of the invention, the scraper modules are attached to a module carrier which extends on the system carrier parallel to the system carrier and is releasably attached there. In order to attach the module carrier to the system carrier, a clamping assembly is provided according to the invention, which applies a clamping force which acts in the transverse direction to the system carrier. The clamping assembly comprises a clamping rod which extends parallel to the system carrier and with which the clamping force is applied by means of a wedge action.

The scraper system according to the invention is thus characterized in accordance with the first aspect of the invention by the system carrier, the module carrier and the clamping rod as three elements which are aligned in parallel and preferably configured in an elongate manner. In preferred embodiments, these three elements extend at least substantially over the entire width of the conveyor belt, which can make handling from the side possible, thereby minimizing or avoiding the need for entering the region beneath the conveyor belt.

The module carrier is attached to the system carrier by a clamping action, in which the clamping force or at least one component hereof acts in the transverse direction of the system carrier. The clamping produces an at least frictionally engaged connection of the module carrier to the system carrier so that the module carrier preferably remains fixed on the system carrier and the forces occurring during the operation of the scraper system due to the contact of the scraper modules with the conveyor belt can be received. The attachment of the module carrier to the system carrier can optionally be supported by a positive receptacle, however to improve the releasability of the connection from the side, a purely frictionally engaged connection may be preferred. The clamping force can act on at least one point of the system carrier and module carrier; it preferably acts over the entire length of the module carrier and/or system carrier or at least at a number of clamping points spaced apart from one another in the longitudinal direction of the system carrier. Thus, a continuously durable connection can be achieved.

According to the invention, the clamping force is applied by means of a wedge action, i.e., by acting on the clamping rod in a first direction, which can be referred to as a wedge or insertion direction, in order to generate the clamping force in a second direction deviating therefrom, which can be referred to as a clamping direction and is aligned transversely to the system carrier. The wedge direction can, for example, be aligned parallel to the longitudinal direction of the system carrier; it is preferably aligned transversely hereto. The wedge action can originate due to a wedge form of the clamping rod or from one or more wedge elements arranged on the clamping rod; additionally or alternatively, the wedge action can also be brought about by separate wedge elements or wedge surfaces which can, for example, be attached stationarily to the system carrier.

Such a scraper system having scraper modules on a module carrier and a clamping assembly which holds by means of a clamping rod, by means of a wedge action, is proving to be exceptionally advantageous, because it is possible to achieve a connection of the scraper modules to the system carrier, which can be held, with a connection which can easily be established and, equally, can be easily released again. By using a clamping rod, the scraper system can be embodied such that access from the side only, preferably from one side only, can be sufficient to establish and/or release the connection.

According to a development of the invention, the clamping force can be applied by at least one surface pairing, wherein at least one of the surfaces involved is a wedge surface. One of the surfaces involved in the surface pairing can be provided on the clamping rod, while the other is preferably fixed to the system carrier. The wedge surface can have an inclination of, for example, 1-45°, preferably 8-30°, particularly preferably 12-20° with respect to the insertion direction, wherein the course does not have to be linear, but changing inclination as well as curvatures are possible. Both surfaces of the surface pairing can also be wedge surfaces.

According to a development, at least one holding element can be arranged on the system carrier and the clamping rod can be arranged between the module carrier and the holding element. Multiple holding elements spaced apart in the longitudinal direction of the system carrier are preferably provided. The holding elements are preferably fixedly attached, directly or indirectly, to the system carrier, for example by a screw connection. The holding elements can protrude, for example, in a direction transversely to the system carrier and thus form counter-bearings for the clamping assembly. By introducing the clamping rod between the holding element(s) and module carrier, the clamping force can be generated in order to fix the module carrier. The holding elements can be coupled to the clamping rod or respectively to elements attached thereto, preferably in each case via surface pairings having one or more wedge surfaces.

In preferred embodiments, at least one counter-holding element can be arranged on the system carrier at a distance from the holding element, so that the module carrier and the clamping rod are arranged between the holding element and the counter-holding element. Multiple spaced counter-holding elements are preferably provided in the longitudinal direction of the system carrier, particularly preferably in pairs with corresponding holding elements. Holding and counter-holding elements can, for example, form a clip, into which the clamping rod and module carrier are clamped.

According to a development, it can be provided that the clamping rod can be acted upon by a connection assembly with a tensioning force in the direction of the system carrier. The tensioning force can then act, for example, in the insertion or wedge direction so that the clamping force is applied transversely thereto by means of a wedge action. The connection assembly can preferably allow a gradual application of the tensioning force, for example by a screw connection, wherein a screw preferably extends transversely to the system carrier, so that the clamping assembly can preferably be tensioned by tightening the screw.

The connection assembly can comprise one or more connection elements, at which the clamping rod can be acted upon in the direction of the system carrier. It preferably comprises at least one first connection element and one second connection element, which are spaced apart from one another in the longitudinal direction of the system carrier. Viewed in the longitudinal direction of the system carrier, at least some, preferably all, of the scraper modules are arranged between the first and the second connection element; the connection elements are particularly preferably each arranged in the end region of the clamping rod and/or system carrier, that is to say so they can be reached as easily as possible from the side.

In preferred embodiments, it can be provided that the module carrier and/or the clamping rod is/are connected in an articulated manner at one point at least to the system carrier, that is to say such that at least during an assembly or dismantling step, the module carrier and/or the clamping rod can be swiveled out with respect to the system carrier. A hinge can preferably be provided in an end region of the system carrier, clamping rod and/or module carrier. The swiveling out can release the system carrier, clamping rod and module carrier from one another even if they are adhering to one another, for example due to contaminations. Such a handling is possible from the side, in particular from the side opposite the hinge.

The module carrier can be configured in one piece and extend, for example, over the entire width of the conveyor belt. However, the module carrier preferably has a plurality of module carrier segments which are arranged so that they align with one another and can be separated from one another. Such a separation into module carrier segments is advantageous, because the module carrier preferably extends over the entire width of the conveyor belt and can, thus, have a considerable length, which is detrimental to the handling. Already by simply subdividing the module carrier into two module carrier segments can halve the length, making significantly simplified handling possible. The module carrier can preferably be divided into 3 or more module carrier segments. This is particularly important during work in confined spaces or on narrow walkways if there is not sufficient space to pull out a full-length module carrier laterally.

The module carrier segments can be connected, for example, solely by the system carrier, i.e., the module carrier segments can be connected independently of one another and only thanks to their respective attachment to the system carrier. The module carrier segments are, however, preferably connected directly, even independently of the system carrier, to form a module carrier.

The module carrier segments can be connected in various ways, including in particular by screw connections, etc. A connection which can be separated without tools, in particular a plug connection, is preferred, as explained in greater detail below.

An aspect, which can constitute a development of the first aspect of the invention according to the present disclosure, also forms a standalone, independent aspect of the invention, relates to a preferred possibility of coupling module carrier segments by means of a plug connection. In this aspect, the scraper module is attached to a module carrier, which is arranged parallel to a system carrier of the scraper system and is attached to the system carrier by applying a clamping force in the transverse direction to the system carrier. A clamping rod is attached parallel to the system carrier and the clamping force is applied by the clamping rod by a wedge action.

Said plug connection can in particular be formed such that it can be established and/or released by a relative movement of the module carrier segments with respect to one another in a plug-in direction. In order to secure the plug connection, a locking device can be provided. In particular, this can comprise a locking element which runs transversely, preferably at right angles, to the plug-in direction. The locking element can preferably be movable in its longitudinal direction in order to establish or override the lock. The plug-in direction of the plug connection preferably lies transversely to the longitudinal direction of the system carrier, particularly preferably at a right angle, while the locking element preferably extends in the longitudinal direction of the system carrier and is also plugged in in this direction.

A connection which is durable and can be easily established can be created by a plug connection having a securing device, while the risk of unintentional releasing of the connection can be minimized.

The locking element is a rod or a tube, for example having a circular or rectangular cross-section. The locking element preferably forms a positive fit with the module carrier segments, for example it can enclose or cover these. The positive coupling preferably provides that the module carrier segments partially or preferably completely enclose the locking element. The module carrier segments particularly preferably have a longitudinal bore, through which the locking element engages. In particular, multiple module carrier segments can be pushed behind one another onto the locking element. The combination of the aforementioned plug connection with such a locking element is particularly preferred.

A module carrier segment that can preferably be used for the embodiments of scraper systems described above constitutes a separate aspect of the invention. Said system carries one or more scraper modules which are preferably firmly attached onto the system and can have a different configuration depending on the intended purpose. The module carrier segment is configured to form a plug connection with a further and preferably identically configured module carrier segment arranged in front of and behind it (in the longitudinal direction of a system carrier). It comprises a longitudinal bore for receiving a locking element.

In order to form the plug connection, the module carrier segment has, at a first end, a plug element which extends in a direction transversely to the longitudinal direction. At a second, opposing end, it has a receiving opening for a plug element which is arranged in a direction transversely to the longitudinal direction, thus enabling a plug element to be inserted in this transverse direction and a form-fitting connection to be formed.

Multiple module carrier segments of this type can, consequently, be arranged behind one another, coupled by means of the respective plug connections and, finally, locked by plugging the locking element into the preferably aligned longitudinal bores.

BRIEF DESCRIPTION OF THE DRAWINGS

Embodiments of the invention are described in greater detail below with reference to drawings, wherein.

DETAILED DESCRIPTION OF EMBODIMENTS

Figure 1:
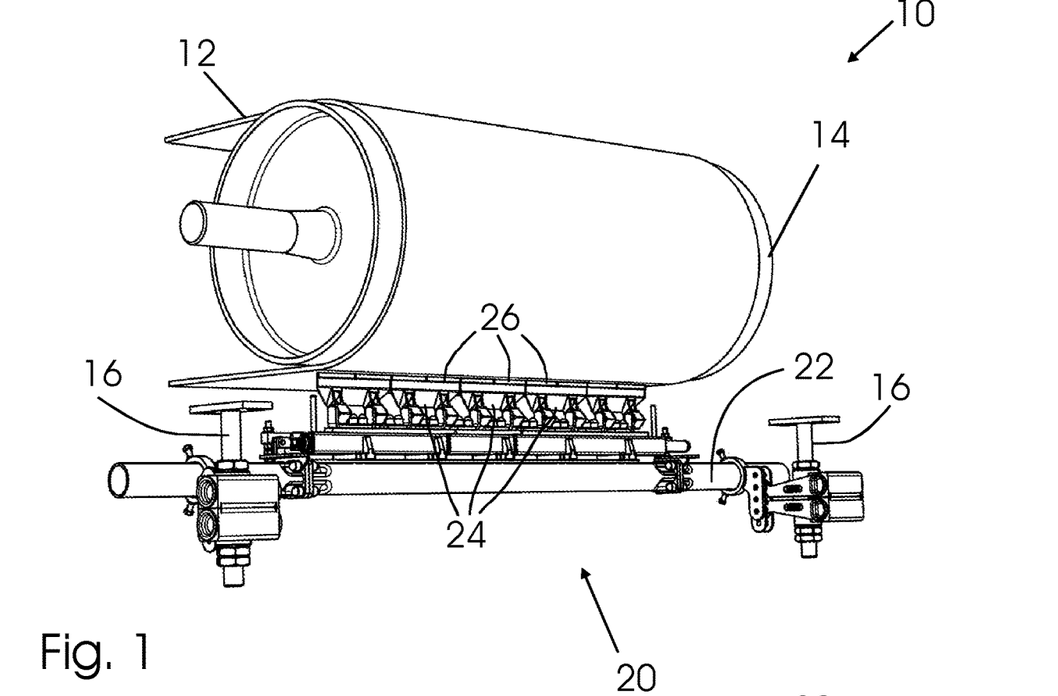
FIG. 1 shows a conveyor system comprising a conveyor belt and an embodiment of a scraper system.

FIG. 1 shows a conveyor system 10 having a conveyor belt 12 which is deflected at a tripper pulley 14.

The conveyor system 10 comprises a scraper system 20 having a number of scraper modules 24. The scraper modules each have scraping elements, here in the form of scraping lamellae 26 which are pressed against the conveyor belt 12 in order to scrape off contaminations, etc. adhering thereto.

In the case of the first embodiment shown of a scraper system 20 in the form of a so-called main scraper, the scraping elements (scraping lamellae 26) lie in contact with the lower run of the conveyor belt 12 from below.

The scraper system 20 has a system carrier 22 which is arranged running transversely to the transport direction of the conveyor belt 12. The system carrier 22 is attached to the belt framework at both ends by means of a fastening 16.

The system carrier 22 is configured, in the example shown, as a circular tube having three aligned segments, two outer and one central segment, which are fastened to one another by means of flanges.

Figure 2:
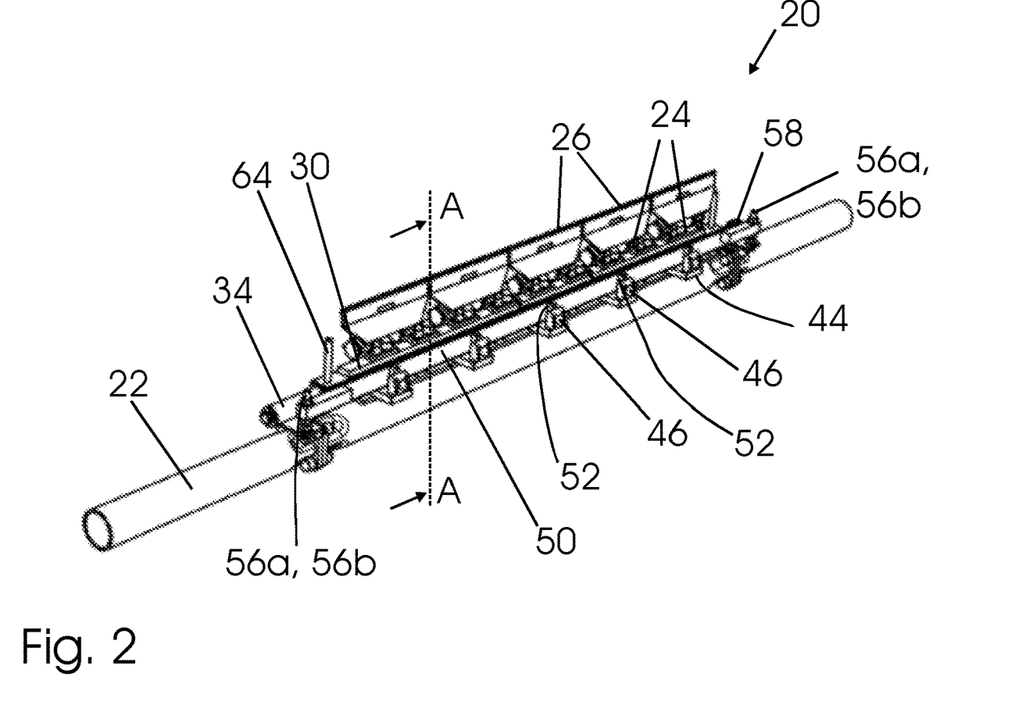
FIG. 2 shows the scraper system from FIG. 1 in a perspective representation.
Figure 3:
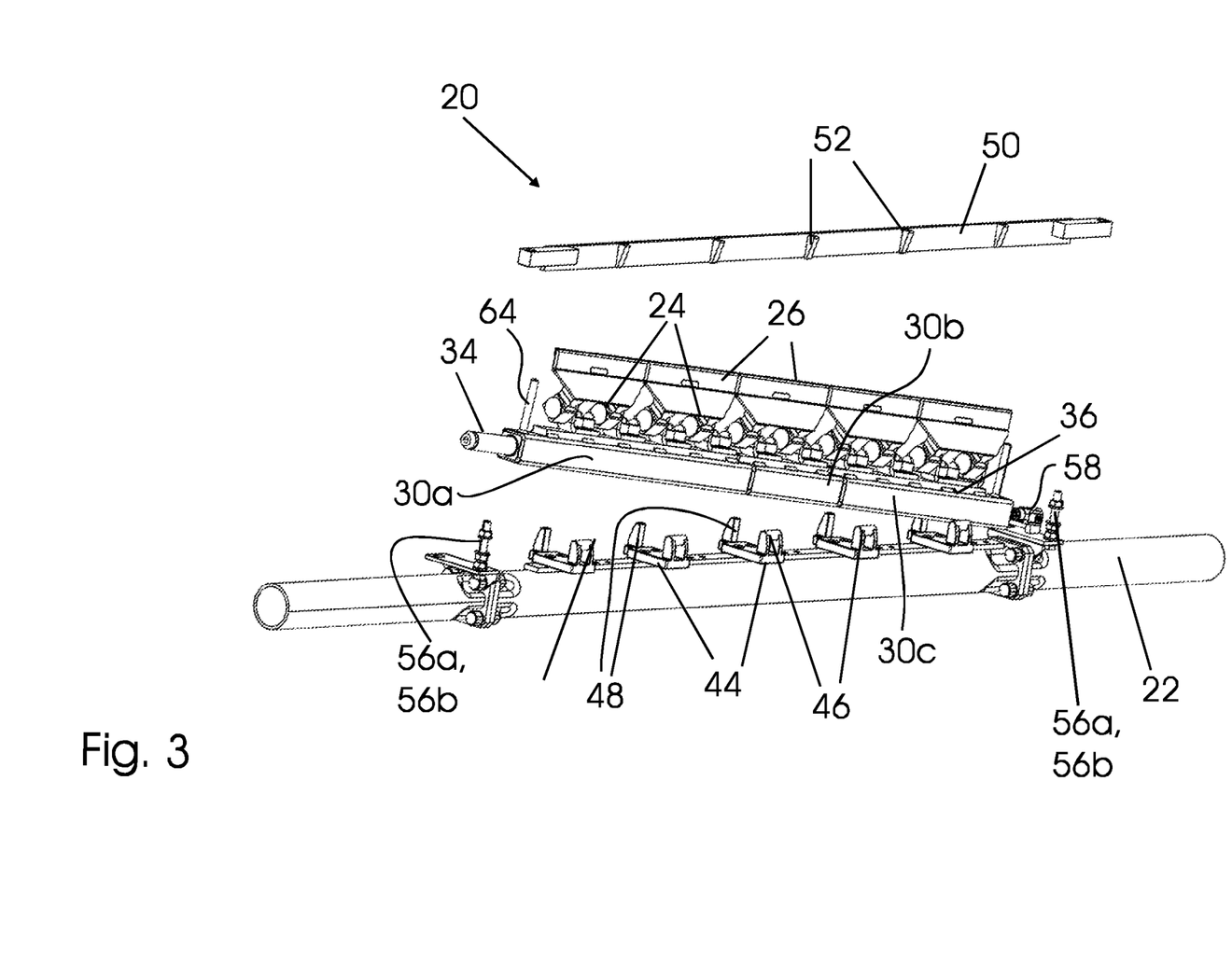
FIG. 3 shows an exploded view of the scraper system from FIGS. 1, 2 in a perspective representation.

As is obvious from FIG. 2 and in particular from the exploded representation in FIG. 3, a module carrier 30, onto which the scraper modules 24 are fastened, is attached onto the upper side of the system carrier 22.

The module carrier 30 is configured as an elongate tube. Its cross-sectional form is, as is obvious for example from the sectional representation of FIG. 4, externally substantially rectangular (with rounded-off corners). Internally, the module carrier 30 has a longitudinal bore 32 into which a circular rod is plugged as a locking element 34.

Figure 7:
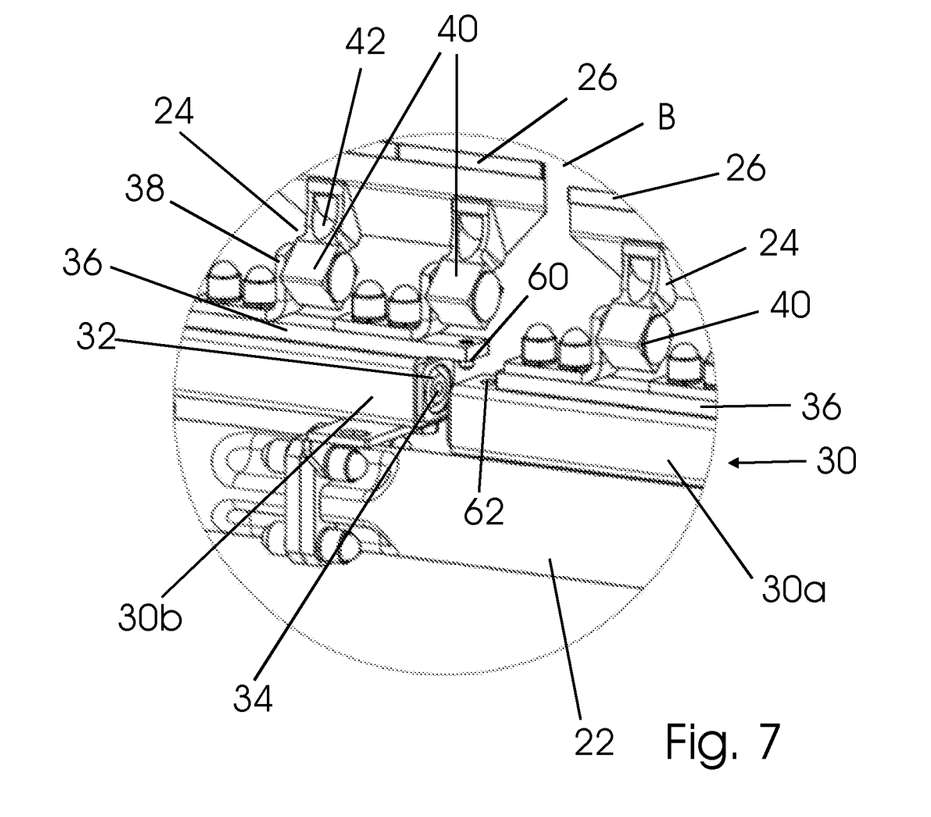
FIG. 7 shows an enlarged representation of the region B from FIG. 6.

As is very obvious in particular from the enlarged representation in FIG. 7, base plates 36, onto which the scraper modules 24 are releasably fastened, preferably by screw connections, are each firmly attached onto, preferably welded onto, the upper side of the module carrier 30. The scraper modules 24 each comprise angles 38 which are fastened by means of screw connections to the module carrier 30. Scraping levers 42 are attached to the angles 38 via hinges 40, which scraping levers carry the scraping lamellae 26. The hinges 40 are each embodied as spring hinges so that the scraping lamellae 26 can be pressed against the belt 12 under spring tension.

The module carrier 30 with the scraper modules 24 fastened thereto is, as depicted in FIG. 3, releasable from the system carrier 22. The module carrier 30 is attached to the system carrier 22 via a releasable clamping connection by means of a separate clamping rod 50.

To this end, clips 44 are attached onto the upper side of the system carrier 22, in each case with a front holding element 46 and a rear counter-holding element 48. The module holder 30 is firmly clamped by means of the clamping rod 50 within the clips 44 between the holding elements 46 and counter-holding elements 48. To this end, the clamping rod 50 has a number of wedge elements 52 distributed uniformly over its length.

Figure 4:
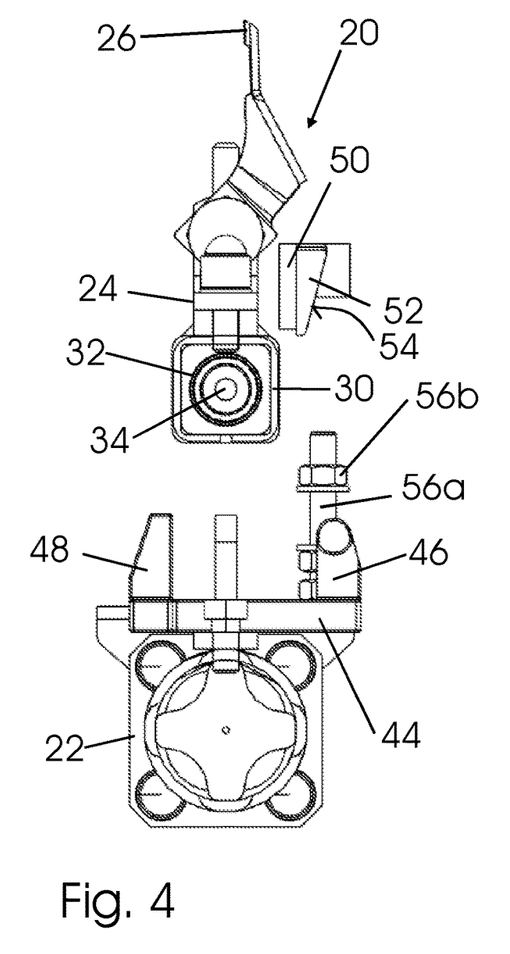
FIGS. 4, 5 show views of a cross-section of the scraper system from FIGS. 1-3 along A . . . A in FIG. 2.
Figure 5:
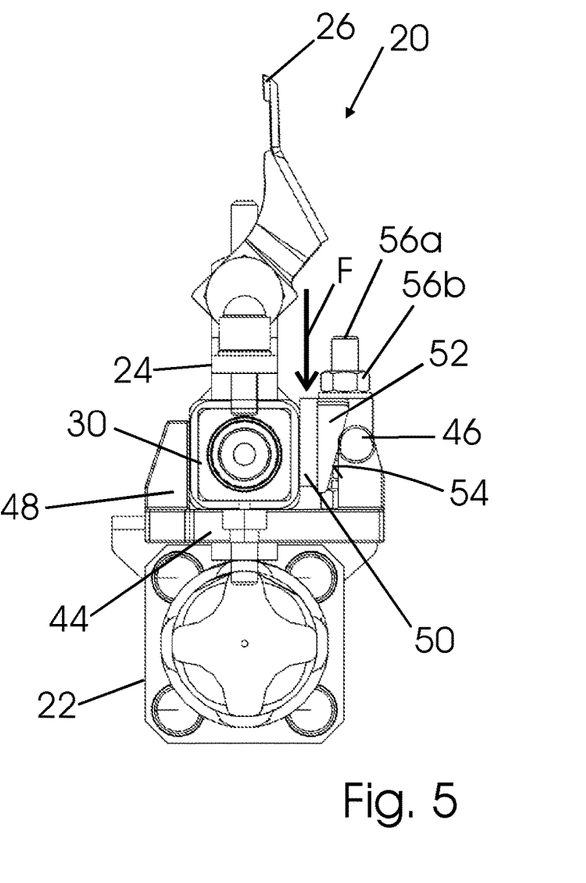

The attachment of the module carrier 30 to the system carrier 22 is depicted in FIG. 4, and FIG. 5. FIG. 4 shows the module carrier 30 with a scraper module 24, the clamping rod 50 with a wedge element 52 and the system carrier 22 with a clip 44 firstly as separate, spaced elements. FIG. 5 shows the clamping assembly formed therefrom, in which the module carrier 30 is received within the clip 44 between the holding element and counter-holding element 46, 48 and clamped by the clamping rod 50.

The wedge elements 52 of the clamping rod 50 have, in the case of the embodiment shown, an outer wedge surface 54 which forms, in the example shown, a wedge angle of approx. 15°. The wedge surface 54 forms a surface pairing with the inside of the holding element 46 (see FIG. 5). When the clamping rod 50 acts on the system carrier 22 in a wedge or insertion direction (tensioning force F in FIG. 5), the surface pairing between the wedge surface 54 and the holder element 46 brings about a clamping force on the module carrier 30 so that the latter is clamped within the clip (44) and held in a frictionally engaged manner.

The tensioning force F acting on the clamping rod 50 in the insertion direction is applied by a connection assembly having screws 56a and nuts 56b. Two screws 56a are spaced apart from one another in the region of both ends of the clamping rod 50 and penetrate the clamping rod which has a wider configuration there. By tightening the nuts 56b, the tensioning force F is applied to the clamping rod 50, by means of which tensioning force the clamping holding device is tensioned.

The module carrier 30 is, as is obvious in particular from FIG. 3, attached to the system carrier 22 at the end represented on the right there by means of a hinge 58 so that, when the clamping connection is released, it can be swiveled with respect to this. The hinge 58 is attached between the locking element 34 of the module carrier and the system carrier 22. As depicted, the module carrier 30 can be pivoted thereon between a swiveled-out position, in which the module carrier 30 is spaced apart from the system carrier 22 (FIG. 3 and FIG. 4) and an operating position, in which the module carrier 30 is positioned directly on the system carrier 22 parallel to the system carrier (FIG. 2, FIG. 5). Thus, by operation from the side, it is possible to release the module carrier 30 simply from the system carrier 22, without having to carry out work in the region beneath the conveyor belt 12.

The module carrier 30 is not in one piece in the embodiment shown, but rather is composed of individual, aligned module carrier segments 30a, 30b, 30c which are pushed onto the locking element 34.

The module carrier segments 30a, 30b, 30c are each interconnected by a secured plug connection. As is obvious from FIG. 7, the module carrier segments 30b, 30c each have a pin 60, the longitudinal direction of which is aligned perpendicularly to the longitudinal direction of the system carrier 22 and the locking element 34. The pin 60 is attached to a tongue protruding at one end of the module carrier segment 30b, said tongue being part of the base plate 36 of the respective module carrier segment 30b, 30c. Compatible with this, the module carrier segments 30a, 30b have bores 62 at the respective adjoining end, the bore direction of said bores likewise being aligned perpendicularly to the longitudinal direction.

In order to couple the module carrier segments 30a, 30b, 30c to one another, these are mated and arranged in an aligned manner such that in each case the pin 60 of the module carrier segments 30b, 30c engages in the bore 62 of the following module carrier segment 30a, 30b. The plug-in direction is, in each case, aligned perpendicularly to the longitudinal direction. Thus, a plug connection of the module carrier segments 30a, 30b, 30c to one another is established.

The plug connection is subsequently secured by plugging the locking element 34 in the longitudinal direction, that is to say transversely to the plug-in direction of the respective pins 60 into the bores 62, through the longitudinal bores 32 of the module carrier segments 30a, 30b, 30c.

Figure 8:
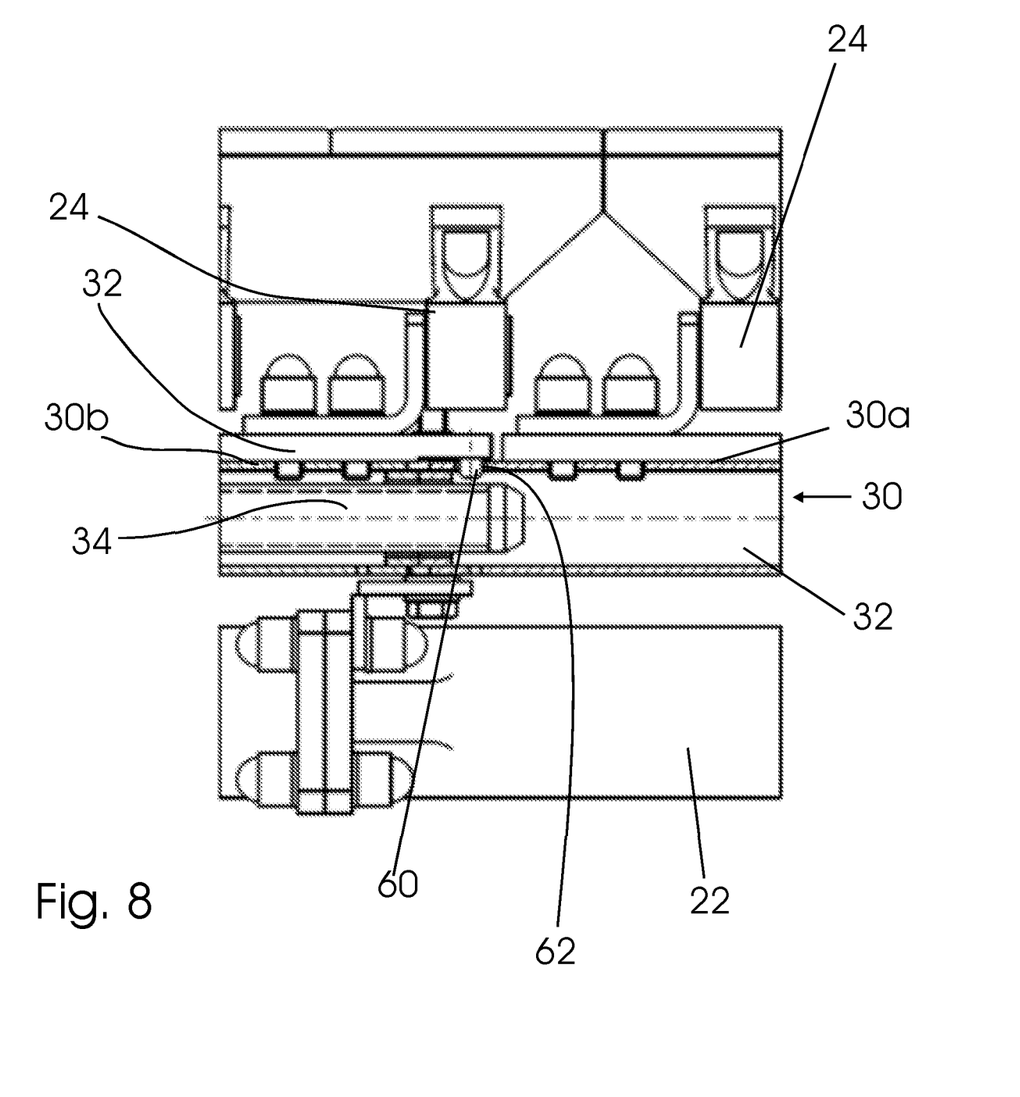
FIG. 8 shows a view of a part of the scraper system from FIGS. 1-7 in a longitudinal section.

FIG. 8 shows a longitudinal section of the secured plug connection thus formed between the module carrier segments 30a, 30b. The pin 60 engages in the bore 62. The locking element 34 is plugged transversely thereto into the aligned longitudinal bores 32. The module carrier segments 30a, 30b are thus fixed to one another in a positive manner and form the module carrier 30 when assembled.

Figure 6:
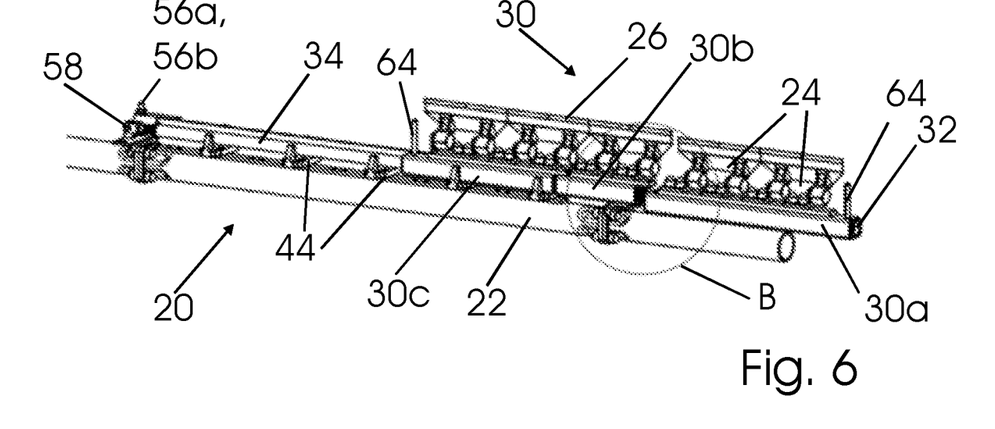
FIG. 6 shows a perspective representation of the scraper system from FIGS. 1-5 with partially extracted module carrier segments.

In order to dismantle the scraper modules 24, the clamping rod 50 is first removed by releasing the connection assembly with screws 56a and nuts 56b on both sides. This releases the clamping assembly so that the module carrier 30 having the locking element 34 can be freely moved in the hinge 58. The module carrier 30 can then be swiveled out as shown in FIG. 3. By grasping handles 64 attached to the ends, the module carrier segments 30a, 30b, 30c can then be slid in the longitudinal direction (see, for example, FIG. 6). As soon as the module carrier segments 30a, 30b have been slid so far that the locking element 34 is retracted from the longitudinal bore 32, the plug connection of pin 60 and bore 62 is releasable so that the module carrier segments 30a, 30b, 30c can be removed separately from one another.

A number of changes, alternatives and modifications to the embodiment shown are possible. Thus, the clamping rod 50 can, for example, have a continually wedge-shaped cross-section, or a different number or arrangement of the wedge elements 52 can be selected. Instead of the individual clips 44, the holding elements and counter-holding elements 46, 48 can also be configured as strips which extend in the longitudinal direction of the system carrier 22.

Figure 9:
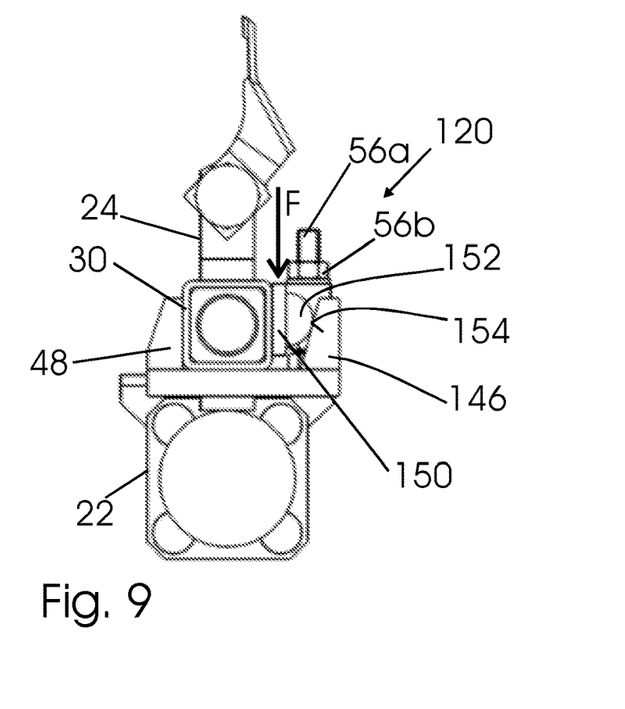
FIG. 9 shows a second embodiment of a scraper system in cross-section.

FIG. 9 shows a second, alternative embodiment of a scraper system 120, wherein the representation corresponds to the sectional representation of the first embodiment of the scraper system 20 in FIG. 5 and, incidentally, the construction of the scraper system 120 also largely corresponds to that of the scraper system 20. Coinciding elements are identified by the same reference numerals. Only the differences between the embodiments are dealt with below.

In the case of the second embodiment of a scraper system 120, a clamping rod 150 is provided with round elements 152, while holding elements 146 attached to the system carrier 22 are each provided with wedge surfaces 154. The round elements 152 and the wedge surfaces 154 form, as in the case of the first embodiment, a surface pairing, with which a clamping force is generated from a tensioning force F by means of a wedge action, which clamping force clamps the module carrier 30 between the holding element 146 and the counter-holding element 48.

Figure 10:
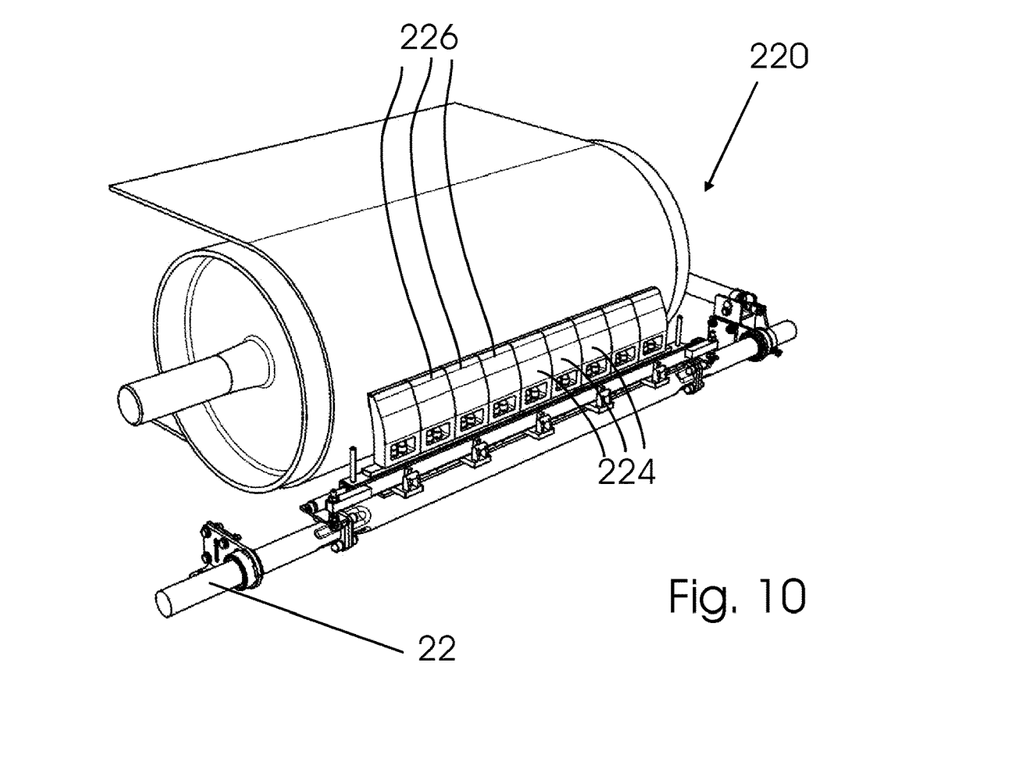
FIG. 10 shows a third embodiment of a scraper system in a perspective view.

FIG. 10 shows a third, alternative embodiment of a scraper system 220. Here as well, the construction of the scraper system 220 largely corresponds to that of the scraper system 20 according to the first embodiment and coinciding elements are identified by the same reference numerals.

The sole difference of the scraper system 220 compared with the scraper system 20 is the different configuration of the scraper modules 224. In the case of the third embodiment, these have scraping blocks 226.

The scraper system 220 can, for example, serve as a preliminary scraper of a conveyor system and can be attached such that the scraping blocks 226 lie in contact with the conveyor belt 12 in the region of the front side of the tripper pulley 14.

As in the case of the first embodiment, the scraper modules 224 having scraping blocks 226 are attached to a module carrier 3o which is fixed by means of a clamping holding device to the system carrier 22.

The invention claimed is:

1. A scraper system for a conveyor system having a conveyor belt, comprising
a system carrier,
and a plurality of scraper modules for lying against the conveyor belt, wherein the scraper modules are arranged on a module carrier,
wherein the module carrier has a plurality of aligned module carrier segments which are interconnected by plug connections which can be established and/or released by a movement against one another parallel to a plug-in direction,
wherein the plug connection is locked by a locking element which runs transversely to the plug-in direction, and
wherein the locking element is a rod or tube which extends in the longitudinal direction of the system carrier parallel to the system carrier and which secures the plug connection of the plurality of module carriers.

2. A scraper system according to claim 1 wherein the module carrier segments have a longitudinal bore, through which the locking element extends, so that the module carrier segments completely enclose the locking element.

3. A scraper system according to claim 1 wherein the module carrier segments are arranged slidable on the locking element in its longitudinal direction in order to secure or release the plug connection.

4. A scraper system according to claim 1 wherein the locking element has a circular or rectangular cross-section.

5. A scraper system according to claim 1 wherein the locking element forms a positive fit connection with the module carrier segments.

6. A scraper system according to claim 1 wherein the module carrier segments enclose the locking element at least partially.

7. A scraper system according to claim 1 wherein the module carrier segments partially enclose the locking element.

8. A scraper system according to claim 1 wherein the module carrier segments include a longitudinal bore through which the locking element engages.

9. A scraper system according to claim 1 wherein the module carrier segments comprise, on a first end, a plug element which extends in a direction transversely to the longitudinal direction of the system carrier,
and on a second, opposing end, a receiving opening for a plug element, wherein the receiving opening is arranged in a direction transversely to the longitudinal direction of the system carrier.

10. A scraper system for a conveyor system having a conveyor belt, comprising
a system carrier,
and a plurality of scraper modules for lying against the conveyor belt, wherein the scraper modules are arranged on a module carrier,
wherein the module carrier has a plurality of aligned module carrier segments which are interconnected by plug connections which can be established and/or released by a movement against one another parallel to a plug-in direction,
wherein the plug connection is locked by a locking element which runs transversely to the plug-in direction,
wherein the module carrier segments comprise, on a first end, a plug element which extends in a direction transversely to the longitudinal direction of the system carrier,
and on a second, opposing end, a receiving opening for a plug element, wherein the receiving opening is arranged in a direction transversely to the longitudinal direction of the system carrier.

* * * * *

UNITED STATES PATENT AND TRADEMARK OFFICE
CERTIFICATE OF CORRECTION

| | | |
|---|---|---|
| PATENT NO. | : 12,227,368 B2 | Page 1 of 1 |
| APPLICATION NO. | : 17/921592 | |
| DATED | : February 18, 2025 | |
| INVENTOR(S) | : Martin Kiel and Claus Weimann | |

It is certified that error appears in the above-identified patent and that said Letters Patent is hereby corrected as shown below:

In the Claims

In Claim 1, Column 10, Line 7, please replace "module carriers" with --module carrier segments--.

Signed and Sealed this
Twenty-second Day of July, 2025

Coke Morgan Stewart
*Acting Director of the United States Patent and Trademark Office*